United States Patent Office 2,762,811
Patented Sept. 11, 1956

2,762,811

ACYCLIC POLYNITRILE-CONTAINING, UNSATURATED COMPOUNDS AND PREPARATION THEREOF

William Joseph Middleton, Claymont, Del., assignor to E. I. du Pont de Nemours and Company, Wilmington, Del., a corporation of Delaware No Drawing. Application May 26, 1955,
Serial No. 511,437

12 Claims. (Cl. 260—286)

This invention relates to acyclic, polynitrile-containing, unsaturated compounds and, more particularly, to hexacyano-3-azapentadiene and its salts, and to their preparation.

In the manufacture of synthetic dyes, the cost of a dye is frequently dependent upon the number of chemical steps required in its synthesis. Each step required adds to the cost of operation and reduces the over-all yield of the final product. Accordingly, it is desirable to find dyes of relatively simple structure which can be produced with readily available reactants by a minimum number of steps. In the copending application of Richard E. Heckert, Serial No. 382,859, filed September 28, 1953, and assigned to the assignee of the present application, there is disclosed the reaction of tetracyanoethylene with an ammonium salt or certain amines to give N-tricyanovinylamines, i. e., compounds containing the characteristic grouping, $(CN)_2C=C(CN)N<$, where $N<$ is an amino nitrogen. This has been found to provide valuable non-acidic dyes. An economically produced compound containing a similar group, but which is acidic and forms metallic salts, should be highly useful as a dye.

It is an object of this invention to provide an acidic compound containing an N-tricyanovinyl group and various salts thereof. Another object is to provide an economical process for preparing these compounds from tetracyanoethylene. Other objects of the invention will become apparent from the specification and claims.

In accordance with this invention, it has been found that ammonia will react with tetracyanoethylene in solution in an inert solvent to produce the ammonium salt of an acidic hexacyano compound, provided that an excess of the tetracyanoethylene is present during the reaction. This is a surprising result, particularly in view of the teaching of the above Heckert application that the reaction of tetracyanoethylene with an ammonium salt gives tricyanovinylamine under similar conditions. The new compounds of this invention have six nitrile substituents attached to carbons of a 3-azapentadiene nucleus so that, depending upon the positions of the double bonds, there are from one to two tricyanovinyl groups. This azapentadiene nucleus also bears a readily ionizable proton; the acidic or salt-free form, where the proton is hydrogen, is highly ionized in aqueous solution to yield hydrogen ions and an anion composed entirely of carbon and nitrogen which forms true salts with the common cations. In the naming of these novel compounds, therefore, this nucleus takes precedence over the nitrile substituents, and the salt-free form is designated hereinafter as 1,1,2,4,5,5-hexacyano-3-azapentadiene.

The ammonium salt of hexacyano-3-azapentadiene produced by the above process can be converted to other salts by metathesis and the free acid, 1,1,2,4,5,5-hexacyano-3-azapentadiene, is obtained by treating a solution of the salt with an ion-exchange resin in acid form. Metal, amine or sulfonium salts are readily prepared from the acid or from its salts, e. g., the barium salt, by metathesis. For convenience in naming the salts of this invention, the anion obtained on removal of the single proton of 1,1,2,4,5,5-hexacyano-3-azapentadiene is called the 1,1,2,4,5,5-hexacyano-3-azapentadienide ion.

It will be readily appreciated by those skilled in the art that the 1,1,2,4,5,5-hexacyano-3-azapentadienide ion is capable of existing in as many as seven resonance forms. This is indicated in part by the following equilibrium in which the charge may be visualized as associated with various atoms in the molecule:

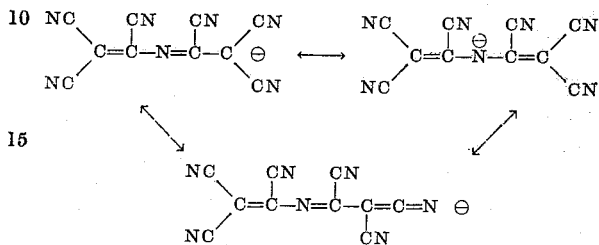

Accordingly, wherever a structural representation of this ion is made in the discussion which follows, it is with the understanding that the form shown is selected for purpose of illustration only and does not necessarily represent the most abundant species of the resonance hybrids.

1,1,2,4,5,5-hexacyano-3-azapentadiene and its salts are solids which are yellow, orange or red in color, and are strongly substantive to certain fibers as dyes. When used as dyes, they impart bright yellow-to-orange colors to the fiber. For example, their substantivity for wool is so strong that when wool is boiled in an aqueous solution of one of these compounds for one or two minutes, it becomes strongly dyed a bright yellow or orange color. More elaborate dyeing procedures may be used with these compounds to obtain greater fastness of the colors.

In the process of preparing 1,1,2,4,5,5-hexacyano-3-azapentadiene by the reaction of tetracyanoethylene with ammonia, it is essential that at least a slight chemical excess of tetracyanoethylene over ammonia be maintained in the solution until substantially all of the tetracyanoethylene has reacted with ammonia if a high yield of pure product is to be obtained. When the opposite situation is maintained, i. e., when there is an excess of ammonia over tetracyanoethylene, the product formed is tricyanovinylamine. Temperature is not a critical factor. However, in order to avoid partial loss of reactants through side reactions such as polymerization, it is desirable for the reaction to be conducted at temperatures below 50° C. and preferably below 25° C.

The inert solvent used should be a solvent for tetracyanoethylene. Suitable solvents include ketones, such as acetone and methyl ethyl ketone, ethers, such as diethyl ether and tetrahydrofuran, esters, such as ethyl formate and ethyl acetate, hydrocarbons, such as benzene, hexane, cyclohexane, toluene and the xylenes, halogenated hydrocarbons, such as chlorobenzene, chloroform and bromoform, and mixtures of water with any of the above which are water-miscible. Pressure is not important in this reaction.

In a preferred embodiment of this invention, ammonia gas is passed into and mixed with an acetone solution of tetracyanoethylene, care being taken to maintain the temperature below 25° C. and to add the ammonia at a rate which will maintain an excess of tetracyanoethylene up until the end of the reaction. The end of the reaction is observed when the blue color characteristic of the reacting mixture fades to a yellow color which is characteristic of ammonium 1,1,2,4,5,5-hexacyano-3-azapentadienide in solution. This salt can be isolated from solution by evaporation of the acetone at room temperature or below. Alternatively, the acetone solution is used to prepare other 1,1,2,4,5,5-hexacyano-3-azapentadienide salts by methathesis as well as for regenerating the free acid by passing the acetone solution through an ion-exchange resin bed which is in acid form.

Tetracyanoethylene for use in this invention is prepared as follows. To a refluxing solution of 33 parts of malononitrile in 600 parts of chloroform, 70 parts of sulfur monochloride is added slowly over a period of six hours. The mixture is refluxed for 20 hours, and the chloroform is boiled off by heating on a steam bath. During the latter stages of this evaporation there is evidence of an exothermic reaction, and some crystalline material is deposited on the walls of the container. This deposit is combined with the residue from the evaporation and extracted exhaustively with diethyl ether in a Soxhlet extractor. The ether extract is evaporated to obtain 18 parts of crude tetracyanoethylene, which is purified by sublimation at 100° C. under reduced pressure (1-2 mm.).

In the following examples, which illustrate specific embodiments of the invention, parts are by weight.

EXAMPLE I

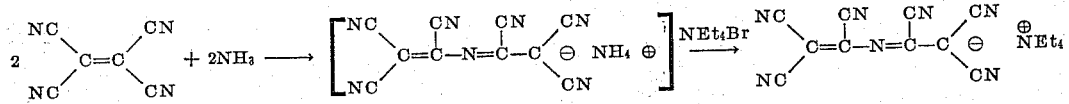

A vigorously stirred solution of 640 parts of tetracyanoethylene in 3960 parts of acetone is cooled to —40° C., and anhydrous ammonia is passed slowly into the solution over a period of about 30 minutes until the initial blue color fades to yellow. The resulting cold solution of ammonium 1,1,2,4,5,5-hexacyano-3-azapentadienide is mixed with a solution of 575 parts of tetraethyl-ammonium bromide in 2500 parts of water, and the mixture is allowed to stand at 0° C. for 30 minutes. The orange precipitate which forms is collected on a filter, washed with water, and recrystallized from alcohol. There is obtained 480 parts (55% yield) of tetraethyl-ammonium 1,1,2,4,5,5-hexacyano-3-azapentadienide in the form of orange needles.

*Analysis.*—Calcd. for $C_{18}H_{20}N_8$: C, 62.05; H, 5.79; N, 32.16. Found: C, 62.27; H, 5.83; N, 32.18, 32.09.

The light absorption spectrum of an acetone solution of this compound shows two peaks, one at 464 millimicrons (molecular extinction coefficient, 45,300) and a second one at 440 millimicrons (molecular extinction coefficient, 38,000).

The process of Example I is repeated with the exception that 300 parts of concentrated aqueous ammonium hydroxide is added in place of gaseous ammonia. After reaction with tetraethylammonium bromide, there is obtained 350 parts of crude tetraethylammonium 1,1,2,4,5,5-hexacyano-3-azapentadienide.

EXAMPLE II

The process of Example I is repeated except that 550 parts of tetramethylammonium chloride is added in place of the tetraethylammonium bromide. The orange-red precipitate which is obtained is recrystallized from water to give 260 parts (35% yield) of tetramethylammonium, 1,1,2,4,5,5-hexacyano-3-azapentadienide in the form of orange-red needles, M. P. 252–254° C.

*Analysis.*—Calcd. for $C_{14}H_{12}N_8$: C, 57.52; H, 4.14; N, 38.34. Found: C, 57.32; H, 4.16; N, 38.30, 38.28.

The light absorption spectrum of an acetone solution of this compound shows two peaks, one at 464 millimicrons (molecular extinction coefficient, 45,300) and a second one at 440 millimicrons (molecular extinction coefficient, 38,000).

EXAMPLE III

The procedure of Example I is repeated except that 1020 parts of trimethylsulfonium iodide is added instead of tetraethylammonium bromide. The orange-yellow precipitate of trimethylsulfonium 1,1,2,4,5,5-hexacyano-3-azapentadienide is recrystallized from water to give 275 parts of orange-yellow needles, M. P. 150–151° C.

*Analysis.*—Calcd. for $C_{13}H_9N_7S$: C, 52.87; H, 3.07; N, 33.20; S, 10.86. Found: C, 52.67; H, 3.00; N, 33.12, 33.25; S, 10.56.

EXAMPLE IV

A solution of 50 parts of tetramethylammonium 1,1,2,4,5,5-hexacyano-3-azapentadienide in 396 parts of acetone is mixed with 500 parts of 5% silver nitrate solution. The red precipitate which forms is collected on a filter, washed with water, and recrystallized from acetonitrile-acetone-water (1:10:50). There is obtained 41 parts (74% yield) of silver 1,1,2,4,5,5-hexacyano-3-azapentadienide in the form of deep red crystals which melt with decomposition when dropped on a block preheated to 270° C. This salt is insoluble in water, slightly soluble in acetone, and very soluble in acetonitrile. This same product is also obtained when tetraethylammonium 1,1,2,4,5,5-hexacyano-3-azapentadienide is employed in the process above.

*Analysis.*—Calcd. for $AgC_{10}N_7$: Ag, 33.08; C, 37.18; N, 29.74. Found: Ag. 33.17; C, 37.10, 36.99; N, 30.16, 30.16.

When cupric nitrate is substituted for silver nitrate in Example IV, red crystals of cupric 1,1,2,4,5,5-hexacyano-3-azapentadienide are obtained.

EXAMPLE V

A solution of 50 parts of tetramethylammonium 1,1,2,-4,5,5-hexacyano-3-azapentadienide in 198 parts of acetone is passed through a column containing an acidic ion-exchange resin ("Amberlite IR–120–H") which has been rendered acid with aqueous hydrochloric acid, washed thoroughly with water, and flushed with acetone to remove part of the water. The acetone percolate is allowed to evaporate to dryness. There is obtained 46 parts of 1,1,2,4,5,5-hexacyano-3-azapentadiene with 3½ moles of water of hydration, in the form of large dark maroon crystals, M. P. 47–52° C.

*Analysis.*—Calcd. for $HC_{10}N_7 \cdot 3½ H_2O$: C, 42.55; H, 2.86; N, 34.75. Found: C, 42.44, 42.50; H, 3.16, 3.17; N, 34.66, 34.48.

1,1,2,4,5,5-hexacyano-3-azapentadiene is a strong acid which possesses a pKa of 2.1 in water. One-volume portions of a 20% aqueous solution of this acid are mixed with 10-volume portions of 10% aqueous solutions of chromic acetate and manganous nitrate. Red-brown crystals of chromic 1,1,2,4,5,5-hexacyano-3-azapentadienide and brown crystals of manganous 1,1,2,4,5,5-hexacyano-3-azapentadienide are precipitated, respectively.

EXAMPLE VI

A solution of 5 parts of 1,1,2,4,5,5-hexacyano-3-azapentadiene (with 3½ moles of water of hydration) in 72 parts of ether is filtered, and the filtrate is mixed with 5 parts of quinoline. The red precipitate which forms is collected on a filter, washed with ether, and recrystallized from alcohol. There is obtained 5 parts of quinolinium 1,1,2,4,5,5-hexacyano-3-azapentadienide in the form of bright, ruby-red plates, M. P. 199–201° C.

*Analysis.*—Calcd. for $C_{19}H_8N_8$: C, 65.51; H, 2.32; N, 32.18. Found: C, 65.53, 65.30; H, 2.31, 2.42; N, 32.13, 31.96.

When N-methylquinolinium iodide is substituted for quinoline in the process of Example VI, N-methylquinolinium 1,1,2,4,5,5-hexacyano-3-azapentadienide is obtained in the form of orange crystals.

EXAMPLE VII

A solution of 10 parts of 1,1,2,4,5,5-hexacyano-3-azapentadiene (with 3½ moles of water of hydration) in 30 parts of water is mixed with a solution of 50 parts of benzamidine hydrochloride in 50 parts of water. The orange precipitate which forms is collected on a filter, washed with water, and recrystallized from water. There is obtained 13 parts of benzamidinium 1,1,2,4,5,5-hexacyano-3-azapentadienide in the form of orange needles, M. P. 152–153° C.

*Analysis.*—Calcd. for $C_{17}N_9H_9$: C, 60.17; H, 2.67; N, 37.15. Found: C, 60.25; H, 2.70; N, 37.17, 37.54.

EXAMPLE VIII

A solution of 10 parts of 1,1,2,4,5,5-hexacyano-3-azapentadiene (with 3½ moles of water of hydration) in 30 parts of water is mixed with a solution of 10 parts of acetamidine hydrochloride in 20 parts of water. The orange precipitate which forms is collected on a filter, washed with water, and recrystallized from water. There is obtained 7 parts of acetamidinium 1,1,2,4,5,5-hexacyano-3-azapentadienide in the form of orange needles, M. P. 151–152° C.

*Analysis.*—Calcd. for $C_{12}H_7N_9$: C, 51.98; H, 2.55; N, 45.46. Found: C, 51.97, 51.75; H, 2.58, 2.66; N, 45.13, 45.01.

EXAMPLE IX

A solution of 50 parts of 1,1,2,4,5,5-hexacyano-3-azapentadiene (with 3½ moles of water of hydration) in 357 parts of ether is mixed with a solution of 50 parts of triphenylphosphine in 357 parts of ether. The crystalline precipitate which forms is collected on a filter and washed with ether. There is obtained 40 parts of triphenylphosphonium 1,1,2,4,5,5-hexacyano-3-azapentadienide in the form of red plates, M. P. 85–87° C.

EXAMPLE X

A solution of 30 parts of 1,1,2,4,5,5-hexacyano-3-azapentadiene in 30 parts of water is mixed with 59 parts of saturated aqueous barium iodide solution. The orange precipitate which forms upon standing is collected on a filter and recrystallized from water. Barium 1,1,2,4,5,5-hexacyano-3-azapentadienide is very soluble in water, and most of it is not recovered from the solution. However, about 8 parts of the orange crystalline salt is obtained.

*Analysis.*—Calcd. for $Ba[C_{10}N_7]_2 \cdot 5H_2O$: C, 36.19; H, 1.52; N, 29.55; Ba, 20.80. Found: C, 35.63, 35.33; H, 1.81, 1.62; N, 29.60, 29.70; Ba, 21.87.

An aqueous solution of barium 1,1,2,4,5,5-hexacyano-3-azapentadienide, as obtained in Example X, is very useful for preparing other 1,1,2,4,5,5-hexacyano-3-azapentadienide salts by reacting with aqueous solutions of the corresponding sulfate. Barium sulfate precipitates quantitatively as a by-product and is readily filtered off, leaving an aqueous solution of a 1,1,2,4,5,5-hexacyano-3-azapentadienide salt of the cation which was introduced in the form of its sulfate. In this way, barium 1,1,2,4,5,5-hexacyano-3-azapentadienide reacts with aqueous solutions of the sulfates of Al, Ce, Cs, $Cr^{++}$, $Cr^{+++}$, $Co^{++}$, $Co^{+++}$, $Cu^{++}$, $Fe^{++}$, $Fe^{+++}$, Ga, In, $Ni^{++}$, Li, K, $Mn^{++}$, Rb, $Sn^{++}$, $Sn^{++++}$ Th, $UO_2$, VO, Zn, Zr, $NH_4^+$, $C_6H_5NH_3^+$, $(C_2H_5)_2NH_2^+$, $(CH_3)_3NH^+$ and $(CH_3)_3S^+$ to yield the corresponding metal, amine or sulfonium salts of 1,1,2,4,5,5-hexacyano-3-azapentadiene.

EXAMPLE XI

A solution of 48 parts of 1,1,2,4,5,5-hexacyano-3-azapentadiene in 2000 parts of water is added to a solution of 86 parts of crystal violet in 20,000 parts of water at 25° C. There is an immediate precipitate. The mixture is stirred an hour at 25° and filtered to separate 105 parts of a solid crystal violet salt of 1,1,2,4,5,5-hexacyano-3-azapentadiene of the probable structure:

$$[p-(CH_3)_2NC_6H_4]_3C^+ \ [C(CN)_2$$
$$=C(CN)NC(CN)=C(CN)_2]^-$$

The same pigment is obtained by mixing methanol solutions of crystal violet and 1,1,2,4,5,5-hexacyano-3-azapentadiene or a tetraalkylammonium 1,1,2,4,5,5-hexacyano-3-azapentadienide. It can be used as a green-black pigment in printing inks and hectograph inks. Hectograph inks have usually required a mixture of two or more pigments to produce a black shade. In order that the color of hectograph reproductions stay on tone, it is necessary that the individual pigments in a mixture have the same rate of solution in the hectograph duplicating solution (e. g., ethyl alcohol), and this is a difficult requirement to meet. For use in hectograph inks, the present pigment has an advantage over a mixture of pigments in that it gives green-black reproductions that stay on tone.

Other basic dyes such as methyl violet, rosaniline and the like react with 1,1,2,4,5,5-hexacyano-3-azapentadiene and its salts in the same way as crystal violet to give amine salts of the acid which are of such low solubility in water that they can be used as pigments in printing inks and hectograph inks.

The use of 1,1,2,4,5,5-hexacyano-3-azapentadiene as a dye is illustrated as follows. Fabrics of wool, nylon, cellulose acetate and "Orlon" acrylic fiber are boiled for two minutes in a 1% aqueous solution of 1,1,2,4,5,5-hexacyano-3-azapentadiene. The fabrics are then removed, washed with soap and warm water, rinsed and dried. The fabrics are strongly colored as follows: wool and nylon, orange; cellulose acetate and "Orlon" acrylic fiber, yellow.

A dye bath is prepared by dissolving one part of 1,1,2,4,5,5-hexacyano-3-azapentadiene in 7500 parts of water containing 2 parts of acetic acid. Seventy-five parts of wool is added to the dye bath at 80° C. The bath is heated to 95° C. and held there for thirty minutes. The wool dyeing is removed, washed with warm water and dried. The wool dyeing has a bright orange color.

The compounds of the present invention become luminescent under ultraviolet light and when exposed to cathode rays. These effects may be observed by visual examination of the appearance of a powdered sample of the compound under ultraviolet light of various wave lengths and by examining it under the influence of cathode rays in an evacuated space. Observations of this sort are shown in the following table:

*Table*

| Salt | Luminescence | | |
| --- | --- | --- | --- |
| | U. V. (2537 A.) | U. V. (3650 A.) | Cathode Rays |
| Silver 1,1,2,4,5,5-hexacyano-3-azapentadienide. | dark red | dark red | dark red. |
| Tetraethylammonium 1,1,2,4,5,5-hexacyano-3-azapentadienide. | orange-red | orange-yellow. | orange-red. |
| N-Methylquinolinium 1,1,2,4,5,5-hexacyano-3-azapentadienide. | do | orange-red | Do. |

The luminescence of 1,1,2,4,5,5-hexacyano-3-azapentadiene and its salts under ultraviolet light makes these compounds useful as fluorescent pigments in fluorescent glow sheets, for illuminated dials, charts and the like. To use these compounds as fluorescent pigments they may be embedded in powder form in a transparent thermoplastic sheet, portions of which are cut and in turn embedded in the face of a supporting thermoplastic base to produce a pattern which is sharply visible when the surface of the composite is illuminated with ultraviolet light. Preparation of composite glow sheets of this type is shown in U. S. Patent No. 2,340,227, issued January 25, 1944, to A. R. Russell.

Since many different embodiments of the invention may be made without departing from the spirit and scope thereof, it is to be understood that the invention is not limited by the specific illustrations except to the extent defined in the following claims.

What is claimed is:

1. A compound selected from the class consisting of 1,1,2,4,5,5-hexacyano-3-azapentadiene and salts thereof.
2. The compound, 1,1,2,4,5,5-hexacyano-3-azapentadiene.
3. Tetraethylammonium 1,1,2,4,5,5-hexacyano-3-azapentadienide.
4. Trimethylsulfonium 1,1,2,4,5,5-hexacyano-3-azapentadienide.
5. A metallic salt of 1,1,2,4,5,5-hexacyano-3-azapentadiene.
6. A salt of 1,1,2,4,5,5-hexacyano-3-azapentadiene and an amine.
7. A salt of the type defined in claim 6 wherein the amine is a basic dye.
8. The process which comprises reacting ammonia with an excess of tetracyanoethylene in solution in an inert solvent to form a salt of 1,1,2,4,5,5-hexacyano-3-azapentadiene.
9. The process which comprises mixing ammonia with a solution of tetracyanoethylene in an inert solvent at a temperature below 50° C., maintaining an excess of tetracyanoethylene over ammonia in the solution until substantially all of the tetracyanoethylene has reacted with ammonia, and adding sufficient ammonia to form ammonium 1,1,2,4,5,5-hexacyano-3-azapentadienide.
10. A process as defined in claim 9 wherein the ammonium salt is isolated by evaporating the solvent.
11. A process as defined in claim 9 wherein the solution of the salt is treated with an ion exchange resin in acid form to liberate 1,1,2,4,5,5-hexacyano-3-azapentadiene.
12. The process which comprises passing ammonia into a solution of tetracyanoethylene in an inert solvent at a temperature below 25° C., mixing the ammonia with the solution while adding the ammonia at a rate which will maintain an excess of tetracyanoethylene until a change of color indicates that the reaction is complete, and isolating the resulting 1,1,2,4,5,5-hexacyano-3-azapentadiene in the form of a salt.

No references cited.